United States Patent
Baek et al.

(10) Patent No.: US 10,498,560 B2
(45) Date of Patent: Dec. 3, 2019

(54) METHOD AND APPARATUS FOR FTN COMMUNICATION USING TRANSMIT DIVERSITY

(71) Applicant: ELECTRONICS AND TELECOMMUNICATIONS RESEARCH INSTITUTE, Daejeon (KR)

(72) Inventors: Myung-Sun Baek, Daejeon (KR); Joung-Il Yun, Daejeon (KR); Sang-Woon Kwak, Daejeon (KR); Hae-Chan Kwon, Daejeon (KR); Young-Su Kim, Daejeon (KR); Hyoung-Soo Lim, Daejeon (KR); Nam-Ho Hur, Sejong (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 15/902,909

(22) Filed: Feb. 22, 2018

(65) Prior Publication Data

US 2019/0013972 A1 Jan. 10, 2019

(30) Foreign Application Priority Data

Jul. 6, 2017 (KR) .................. 10-2017-0086157

(51) Int. Cl.
| | | |
|---|---|---|
| H04L 25/03 | (2006.01) | |
| H04L 1/06 | (2006.01) | |
| H04W 72/08 | (2009.01) | |
| H04W 28/02 | (2009.01) | |
| H04B 1/7097 | (2011.01) | |
| H04L 1/00 | (2006.01) | |
| H04L 1/20 | (2006.01) | |

(52) U.S. Cl.
CPC ..... *H04L 25/03006* (2013.01); *H04B 1/7097* (2013.01); *H04L 1/0026* (2013.01); *H04L 1/0045* (2013.01); *H04L 1/0618* (2013.01); *H04L 1/0625* (2013.01); *H04L 1/203* (2013.01); *H04W 28/0268* (2013.01); *H04W 72/082* (2013.01)

(58) Field of Classification Search
CPC ............ H04L 25/03006; H04L 1/0618; H04B 1/7097; H04W 28/0268; H04W 72/082
USPC ....................................... 375/267
See application file for complete search history.

(56) References Cited

U.S. PATENT DOCUMENTS

| 8,514,966 B2 | 8/2013 | Wajcer et al. |
| 2016/0218908 A1 | 7/2016 | Baek et al. |
| 2016/0269049 A1 | 9/2016 | Kim et al. |

*Primary Examiner* — Michael R Neff

(57) ABSTRACT

Disclosed herein are an apparatus and method for providing FTN communication using transmit diversity. A transmission apparatus generates a signal to be output through diversity modulation. A diversity order of diversity modulation may be set based on an FTN parameter, such as a variable for adjusting sampling time or a symbol transmission speed. When the diversity order is set based on the FTN parameter, the FTN parameter and the diversity order may be set so as to satisfy a QoS required of the transmission apparatus, such as a transmission rate and a Bit Error Rate. Depending on the circumstances, the set FTN parameter and diversity order may be provided to a reception apparatus that is to receive the output signal.

20 Claims, 13 Drawing Sheets

|        | Tx 1      | Tx 2      |
|--------|-----------|-----------|
| TIME 1 | $S_1$     | $S_2$     |
| TIME 2 | $-S_2^*$  | $-S_1^*$  |

FIG. 9

METHOD AND APPARATUS FOR FTN COMMUNICATION USING TRANSMIT DIVERSITY

CROSS REFERENCE TO RELATED APPLICATION

This application claims the benefit of Korean Patent Application No. 10-2017-0086157, filed Jul. 6, 2017, which is hereby incorporated by reference in its entirety into this application.

BACKGROUND OF THE INVENTION

1. Technical Field

The following embodiments relate generally to a method and apparatus for providing FTN communication, and more particularly to a method and apparatus for providing FTN communication using transmit diversity.

2. Description of the Related Art

In a Nyquist transmission method used in conventional broadcast systems and communication systems, the shape of pulses and transmission speed are determined so as to enable signals to be transmitted without Inter-Symbol Interference (ISI) in a given bandwidth.

As a method for improving the transmission rate in a system using the Nyquist transmission method, there are a method of decreasing a pulse-shaping period, a method of raising a symbol modulation level, and the like.

However, decreasing a pulse-shaping period increases system bandwidth, and raising the symbol modulation level requires a higher Signal-to-Noise Ratio (SNR) for the same level of signal detection.

In order to overcome the limitations of existing transmission methods such as the Nyquist transmission method, a Faster-Than-Nyquist (FTN) transmission method, in which the transmission rate may be improved without using a higher modulation level in a given bandwidth, has been proposed.

The FTN transmission method is configured such that signals are transmitted with a shorter pulse-shaping period while maintaining a pulse shape, which is determined depending on bandwidth.

When signals are transmitted using the FTN transmission method, Inter-Symbol Interference (ISI) is necessarily generated in the transmitted signals. Here, ISI generated due to the FTN transmission method is called "FTN interference".

Such FTN interference deteriorates signal detection performance. Here, if the pattern of the FTN interference is known in advance, a receiver may reconstruct original signals using various interference cancellation methods.

As a method for eliminating FTN interference, a method in which interference cancellation and channel decoding are repeatedly performed through interworking of an interference cancellation unit and a channel-decoding unit may be considered. This method has a structure in which the elimination of interference from a received signal sequence improves the performance of channel code and a channel-decoded sequence is used to further eliminate interference, whereby performance is gradually improved. Here, in order to use the channel-decoded sequence for interference cancellation, a method in which the prior probability of a received symbol sequence is applied depending on the configuration of an interference cancellation unit, a method in which FTN interference is estimated from a decoded signal sequence and is then eliminated, and the like may be considered.

SUMMARY OF THE INVENTION

An embodiment may provide an apparatus and method for acquiring a high transmission rate by applying a diversity method to a communication system using the FTN transmission method.

An embodiment may provide an apparatus and method for effectively improving reception performance by applying a diversity method to a communication system using the FTN transmission method.

An embodiment may provide an apparatus and method for providing high stability by applying a diversity method to a communication system using the FTN transmission method.

In an aspect, there is provided a method for transmitting a signal, performed by a transmission apparatus, the method including setting a diversity order of diversity modulation based on a Faster-Than-Nyquist (FTN) parameter; generating a diversity signal by modulating a signal depending on the set diversity order; generating a linearly modulated signal by applying linear modulation, based on the FTN parameter, to the diversity signal; and outputting the linearly modulated signal.

The FTN parameter may include a variable for adjusting a sampling time.

The FTN parameter may include a symbol transmission speed of linear modulation.

The diversity order may be set higher as the symbol transmission speed is higher.

The method may further include deriving the FTN parameter corresponding to a transmission rate required of the transmission apparatus.

The method may further include deriving the transmission rate from a Quality of Service (QoS) required of the transmission apparatus.

The diversity order may be set based on a Bit Error Rate required of the transmission apparatus.

The Bit Error Rate may be derived from a QoS required of the transmission apparatus.

The diversity order may be a value required based on a degree of performance degradation analyzed depending on the FTN parameter.

The method may further include transmitting information about the FTN parameter to a transmission filter for performing the linear modulation.

The method may further include transmitting information about the diversity order to a reception apparatus that is to receive the output signal.

The method may further include transmitting information about the FTN parameter to a reception apparatus that is to receive the output signal.

In another aspect, there is provided a transmission apparatus, which includes a diversity-order-setting unit for setting a diversity order of diversity modulation based on a Faster-Than-Nyquist (FTN) parameter; a diversity modulation unit for generating a diversity signal by modulating a signal depending on the set diversity order; a transmission filter for generating a linearly modulated signal by applying linear modulation based on the FTN parameter to the diversity signal; and an antenna array for outputting the linearly modulated signal.

In a further aspect, there is provided a method for setting a diversity order, which includes deriving a Faster-Than-Nyquist (FTN) parameter corresponding to a Quality of Service (QoS) required of a transmission apparatus; and setting a diversity order of diversity modulation based on the FTN parameter.

The FTN parameter may include a variable for adjusting a sampling time.

The diversity order may be set higher as a value of the variable for adjusting sampling time is larger.

The QoS may include a transmission rate required of the transmission apparatus.

The diversity order may be set based on a Bit Error Rate required of the transmission apparatus.

The diversity order may be a value required based on a degree of performance degradation analyzed depending on the FTN parameter.

The method may further include transmitting information about the diversity order to a reception apparatus that is to receive the output signal.

Additionally, other methods, devices, and systems for implementing the present invention and a computer-readable recording medium for recording a computer program for implementing the above-described methods are further provided.

BRIEF DESCRIPTION OF THE DRAWINGS

The above and other objects, features and advantages of the present invention will be more clearly understood from the following detailed description taken in conjunction with the accompanying drawings, in which:

FIG. 9 shows a signal transmitted based on a transmit diversity method using two transmission antennas according to an example;

DESCRIPTION OF THE PREFERRED EMBODIMENTS

Figure 1:
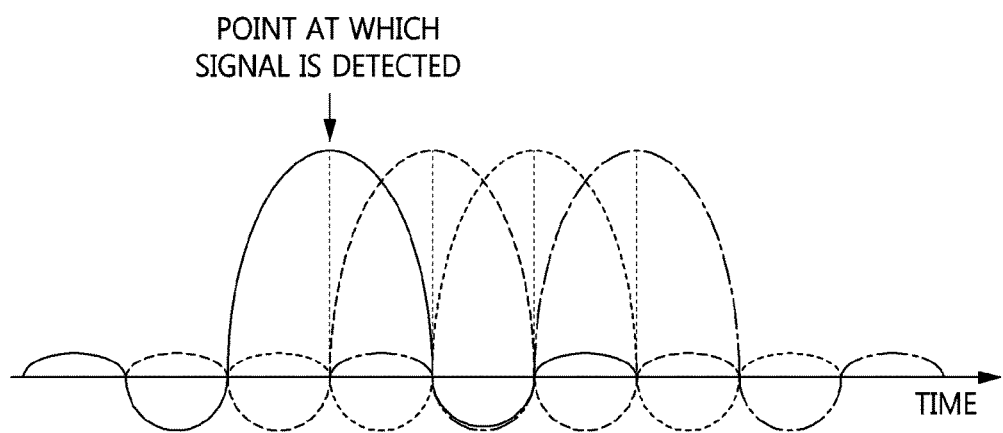
FIG. 1 shows the transmission of a signal using a Nyquist rate according to an example.

Specific embodiments will be described in detail below with reference to the attached drawings. These embodiments are described in sufficient detail to enable those skilled in the art to practice the present invention. It should be understood that the embodiments differ from each other, but the embodiments do not need to be exclusive of each other. For example, a particular feature, structure, or characteristic described herein in connection with one embodiment may be implemented in another embodiment without departing from the sprit and scope of the present invention. Also, it should be understood that the location or arrangement of individual elements in the disclosed embodiments may be changed without departing from the spirit and scope of the present invention. Therefore, the following detailed description is not to be taken in a limiting sense, and if appropriately interpreted, the scope of the exemplary embodiments is limited only by the appended claims, along with the full range of equivalents to which the claims are entitled.

The same reference numerals are used to designate the same or similar elements throughout the drawings. The shapes, sizes, etc. of components in the drawings may be exaggerated to make the description clear.

The terms used herein are for the purpose of describing particular embodiments only and are not intended to be limiting of the present invention. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element, or intervening elements may be present.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

Also, element modules described in the embodiments of the present invention are independently shown in order to indicate different characteristic functions, but this does not mean that each of the element modules is formed of a separate piece of hardware or software. That is, element modules are arranged and included for convenience of description, and at least two of the element units may form one element unit, or one element may be divided into multiple element units and the multiple element units may perform respective functions. An embodiment into which the elements are integrated or an embodiment from which some elements are removed is included in the scope of the present invention, as long as it does not depart from the essence of the present invention.

Also, in the present invention, some elements are not essential elements for performing essential functions, but may be optional elements for improving only performance. The present invention may be implemented using only essential elements for implementing the essence of the present invention, excluding elements used to improve only performance, and a structure including only essential elements, excluding optional elements used only to improve performance, is included in the scope of the present invention.

Hereinafter, embodiments of the present invention are described with reference to the accompanying drawings in order to describe the present invention in detail so that those having ordinary knowledge in the technical field to which the present invention pertains can easily practice the present invention. In the following description of the present invention, detailed descriptions of known functions and configurations which are deemed to make the gist of the present invention obscure will be omitted.

FIG. 1 shows the transmission of a signal using a Nyquist rate according to an example.

FIG. 1 may represent the transmission filter of a transmission apparatus for transmitting a signal using a Nyquist rate.

In FIG. 1, each of the four different lines may represent a signal for a symbol. In the graph, the x-axis and the y-axis represent time and the strength of a signal, respectively.

As illustrated in FIG. 1, when a signal is transmitted using a Nyquist rate, there may be no Inter-Symbol Interference (ISI) at the transmitter (TX).

Figure 2:
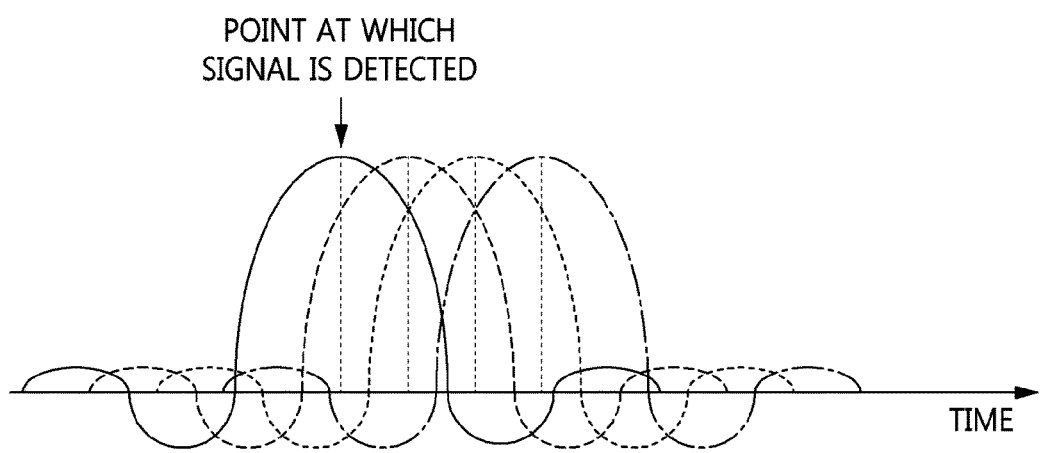
FIG. 2 shows the transmission of a signal using FTN according to an example.

FIG. 2 shows the transmission of a signal using FTN according to an example.

The FTN transmission method may be a method for transmitting a signal faster than the Nyquist rate that is given based on a frequency range.

As illustrated in FIG. 2, the transmission using FTN may necessarily generate ISI in a transmitted signal. However, in spite of necessarily generated ISI, it is known that the use of the FTN method may increase a symbol transmission speed, compared to the Nyquist rate, without affecting a Bit Error Rate (BER).

Figure 3:
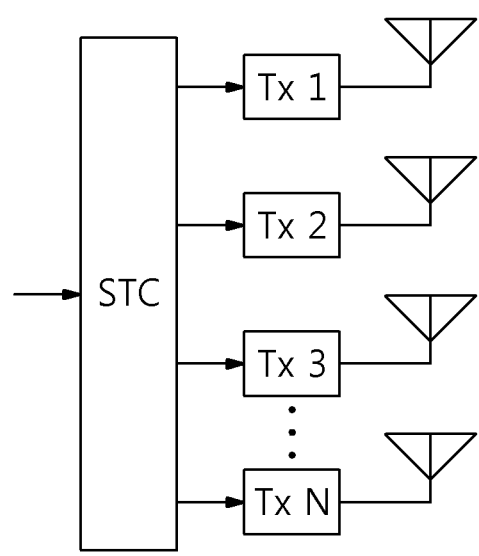
FIG. 3 shows a transmission apparatus to which multiple transmission antennas are applied according to an example.
Figure 4:
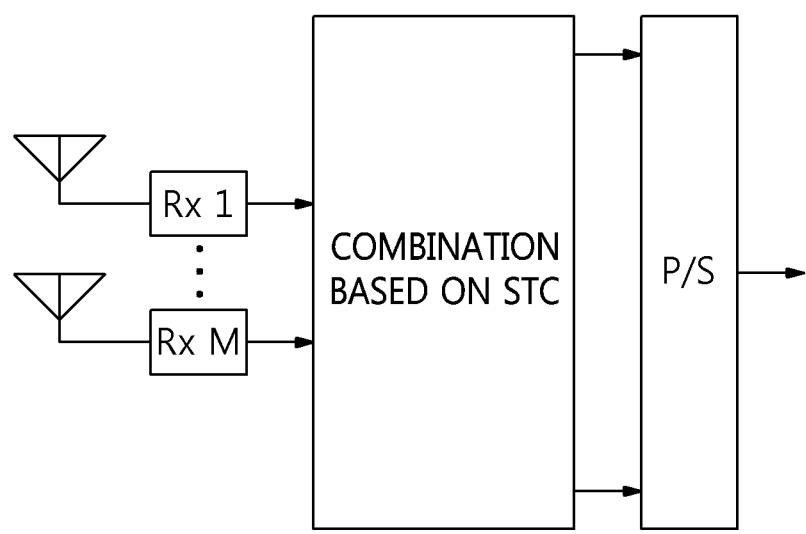
FIG. 4 shows a reception apparatus to which multiple reception antennas are applied according to an example.

In FIG. 3 and FIG. 4, a transmission apparatus and a reception apparatus of a Multiple-Input Multiple-Output (MIMO) communication system according to an example are explained.

FIG. 3 shows a transmission apparatus to which multiple transmission antennas are applied according to an example.

In FIG. 3, 'Tx' may represent a transmitter. In FIG. 3, Tx 1 to Tx N for multiplexing are illustrated.

The transmission apparatus may modulate data to be transmitted to a transmit-diversity signal based on Space-Time Coding (STC). The transmit-diversity signal may be transmitted to a reception apparatus through the multiple transmission antennas.

FIG. 4 shows a reception apparatus to which multiple reception antennas are applied according to an example.

In FIG. 4, 'Rx' may represent a receiver. In FIG. 4, Rx 1 to Rx M for multipath reception are illustrated.

The reception apparatus may receive a signal, transmitted from the transmission apparatus, through a single reception antenna or multiple reception antennas.

The reception apparatus may acquire data from the received signal through a combining technique based on STC and parallel-to-serial (P/S) conversion.

The spatial-time diversity method to which MIMO is applied may acquire the effect of transmit diversity using a simple operation. Also, the spatial-time diversity method to which MIMO is applied may provide improved stability by improving communication performance. Meanwhile, in order to obtain the advantage of improved stability, additional signal processing for high-order modulation, low encoding rate, and the like is required. Accordingly, when FTN technology is combined with diversity technology, high stability may be acquired, and fast communication may be implemented.

Figure 5:
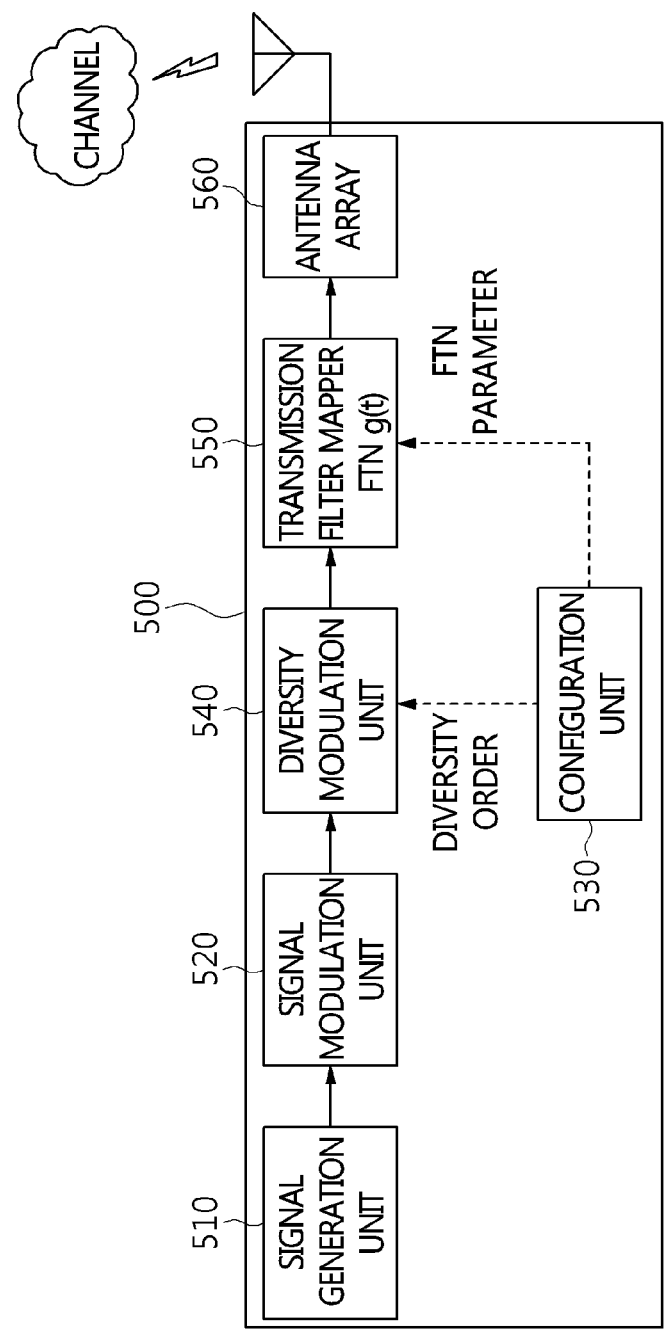
FIG. 5 is a block diagram of a transmission apparatus according to an embodiment.

FIG. 5 is a block diagram of a transmission apparatus according to an embodiment.

The transmission apparatus 500 may include a signal generation unit 510, a signal modulation unit 520, a configuration unit 530, a diversity modulation unit 540, a transmission filter 550, and an antenna array 560.

The antenna array 560 may include N transmission antennas. N may be an integer that is equal to or greater than 1.

The signal generation unit 510, the signal modulation unit 520, the configuration unit 530, and the transmission filter 550 may comprise multiple signal generation units, multiple signal modulation units, multiple configuration units, and multiple transmission filters, respectively. The signal generation unit 510, the signal modulation unit 520, the configuration unit 530, and the transmission filter 550 may comprise N signal generation units, N signal modulation units, N configuration units, and N transmission filters, respectively.

The operations and functions of the signal generation unit 510, the signal modulation unit 520, the configuration unit 530, the diversity modulation unit 540, the transmission filter 550, and the antenna array 560 will be described below with reference to FIG. 7.

Figure 6:
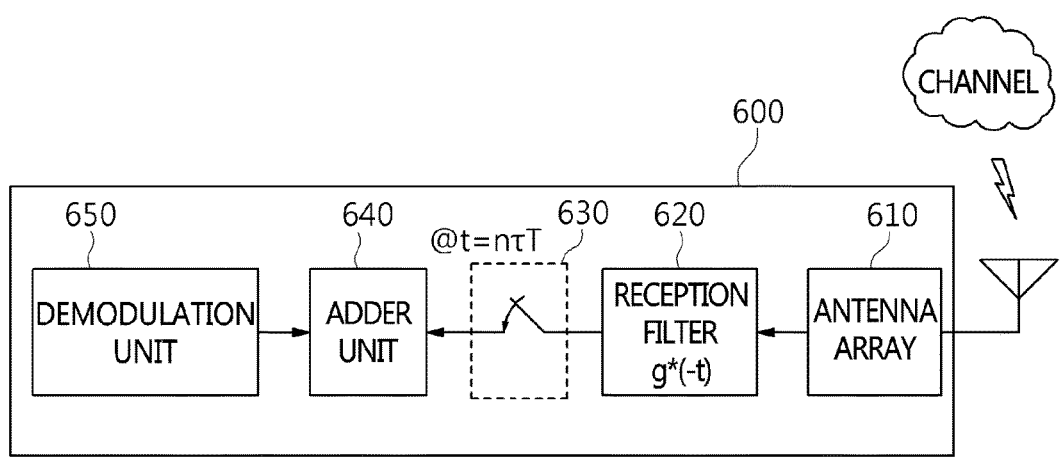
FIG. 6 is a block diagram of a reception apparatus according to an embodiment.

FIG. 6 is a block diagram of a reception apparatus according to an embodiment.

The reception apparatus 600 may include an antenna array 610, a reception filter 620, a sampler 630, an adder unit 640, and a demodulation unit 650.

The antenna array 610 may include M reception antennas. M may be an integer that is equal to or greater than 1.

The reception filter 620, the sampler 630, and the demodulation unit 650 may comprise multiple reception filters, multiple samplers, and multiple demodulation units, respectively. The reception filter 620 and the sampler 630 may comprise M reception filters and M samplers, respectively. The demodulation unit 650 may comprise N demodulation units.

The operations and functions of the antenna array 610, the reception filter 620, the sampler 630, the adder unit 640, and the demodulation unit 650 will be described below with reference to FIG. 8.

The transmission apparatus 500 and the reception apparatus 600 may constitute a diversity communication system based on FTN.

Figure 7:
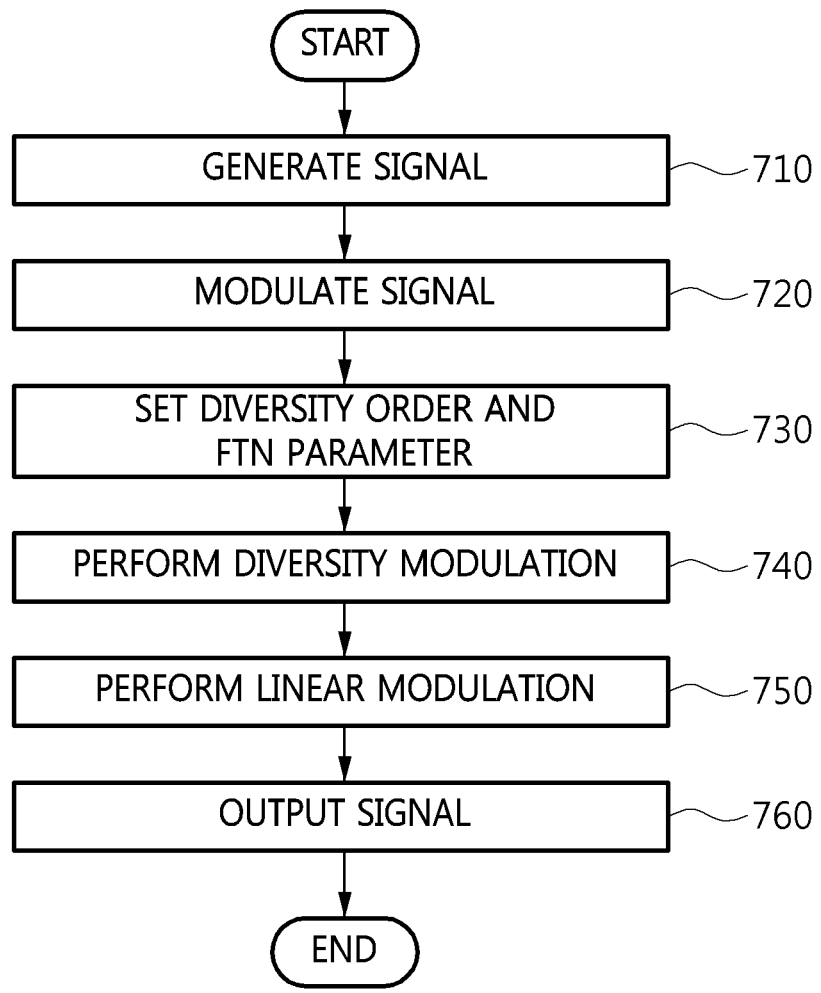
FIG. 7 is a flowchart of a transmission method according to an embodiment.

FIG. 7 is a flowchart of a transmission method according to an embodiment.

Hereinafter, a method for applying transmit/receive diversity in a communication system using FTN and a method for changing an FTN parameter depending on a diversity order will be described.

At step 710, the signal generation unit 510 of the transmission apparatus 500 may generate a digital signal for representing data.

At step 720, the signal modulation unit 520 may generate symbols by modulating the digital signal to specified symbols.

The symbols may be Phase-Shift Keying (PSK) or Quadrature Amplitude Modulation (QAM) symbols, used in general communication system.

At step 730, the configuration unit 530 may set a diversity order and an FTN parameter.

The configuration unit 530 may set the diversity order of diversity modulation. The configuration unit 530 may provide information about the diversity order to the diversity modulation unit 540.

The configuration unit 530 may set the FTN parameter for linear modulation. The FTN parameter may include τT which represents a symbol transmission speed or a symbol transmission period, or a variable τ for adjusting the FTN sampling time. T may represent a symbol transmission speed or a symbol transmission period at a Nyquist rate.

τT is set faster than the Nyquist rate, whereby the transmission rate of the transmission apparatus 500 may be improved. However, because the symbol transmission speed is faster than the Nyquist rate, Inter-Symbol Interference (ISI) may be generated in the transmitted signal.

The configuration unit 530 may provide information about the FTN parameter to the transmission filter 550.

The configuration and operation of the configuration unit 530 will be described in detail below with reference to FIG. 10 and FIG. 11.

At step 740, the diversity modulation unit 540 may generate a diversity signal by applying diversity modulation to the symbols.

The diversity order of diversity modulation applied to the symbols may be set by the configuration unit 530 at step 730.

For diversity modulation, Space-Time Code (STC), Space-Frequency Code (SFC) or Cyclic Delay Diversity (CDD) may be used. Also, another transmit diversity method may be used for diversity modulation.

For example, diversity modulation may be modulation using Space-Time Block Code (STBC), which is a diversity method using STC.

The diversity modulation using STBC according to an example will be described below with reference to FIG. 9.

At step 750, the transmission filter 550 applies linear modulation to the diversity signal depending on the FTN parameter, thereby generating a linearly modulated signal. The transmission filter 550 may generate a linearly modulated signal by applying pulse-shaping to the diversity signal. The linearly modulated signal may be an FTN-based diversity signal.

The transmission filter 550 may be a filter for linear modulation based on FTN, or may be an FTN mapper.

The transmission filter 550 may use the FTN parameter when it applies linear modulation.

The transmission filter 550 may generate a linearly modulated signal by linearly modulating the diversity signal at τT.

At step 760, the antenna array 560 may output the linearly modulated signal. The antenna array 560 may transmit the linearly modulated signal to the reception apparatus 600.

Space-Time Diversity Technique

The diversity order of a space-time diversity technique may be changed or decided depending on 1) the number of transmission antennas, 2) the number of reception antennas, and 3) the diversity signal generation method.

When a high diversity order is applied in a communication system, a reception apparatus 600 may repeatedly receive the same signal through independent uncorrelated paths. Accordingly, with an increase in the diversity order, reception stability may be improved, and the error rate of a received signal may be decreased.

In the FTN-based diversity communication system, a symbol transmission speed may be changed through FTN signal processing based on the Quality of Service (QoS) of the communication system and the diversity order, and a transmission rate may be adjusted by changing the symbol transmission speed.

The change of the symbol transmission speed and the adjustment of the transmission rate may be performed by the above-described configuration unit 530.

The configuration unit 530 may set the symbol transmission speed of FTN based on the QoS of the communication system and the diversity order.

For example, because signal reception performance may be further improved when a high diversity order is applied, the configuration unit 530 may increase the symbol transmission speed as the diversity order is higher. Also, the configuration unit 530 may decrease the symbol transmission speed as the diversity order is lower.

Depending on the characteristics of communication systems, different QoS may be applied to the respective communication systems. Accordingly, the configuration unit 530 may set the symbol transmission speed of FTN based not only on the diversity order but also on the requirement for QoS of the communication system.

Figure 8:
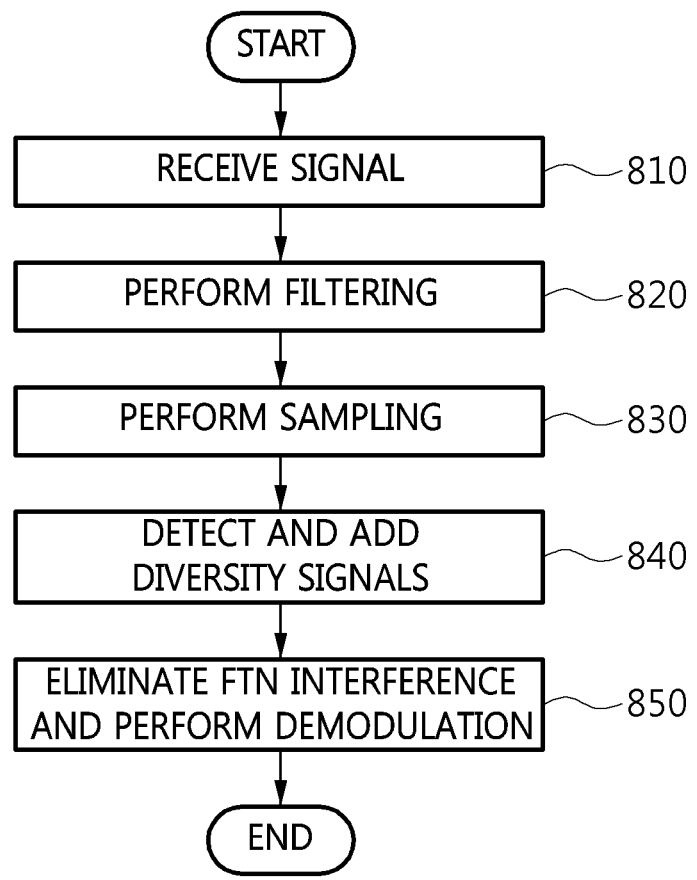
FIG. 8 is a flowchart of a reception method according to an example.

FIG. 8 is a flowchart of a reception method according to an example.

The FTN-based diversity signal output from the transmission apparatus 500 may be transmitted to the reception apparatus 600 through multipath channels.

At step 810, a single reception antenna or multiple reception antennas in the antenna array 610 may receive the FTN-based diversity signal output from the transmission apparatus 500.

At step 820, the reception filter 620 may generate a filtered signal by filtering the FTN-based diversity signal.

The impulse response of the reception filter may be $g^*(-t)$.

At step 830, the sampler 630 may generate a sampled signal by sampling the filtered signal.

As shown in FIG. 6, the sampling operation may be represented as "@t=nτT". That is, the sampling rate of the sampling operation may be 1/τT.

At step 840, the adder unit 640 detects diversity signals from the filtered signal and adds the diversity signals, thereby generating an added signal.

The adder unit 640 may generate separate signals by separating the filtered signal into signals before diversity modulation.

The adder unit 640 may generate an added signal by adding the separate signals. The added signal may be a received FTN signal that acquires a diversity gain.

At step 850, the demodulation unit 650 may finally detect the transmitted signal by eliminating FTN interference from the added signal and demodulating the signal.

The demodulation unit 650 eliminates FTN interference from the added signal, thereby generating a signal from which FTN interference is eliminated.

In order to eliminate FTN interference, an FTN interference cancellation method, such as a Bahl-Cocke-Jelinek-Raviv (BCJR) algorithm, a Minimum Mean Square Error (MMSE) algorithm, an Iterative Demodulation and Decoding (IDD) algorithm, or the like, may be used. In an embodiment, the demodulation unit 650 may use various existing FTN interference cancellation methods in order to eliminate FTN interference from the received FTN signal. A detailed description of the FTN interference cancellation method will be omitted.

The demodulation unit 650 may finally detect the transmitted signal by demodulating the signal from which FTN interference is eliminated.

Figure 9:
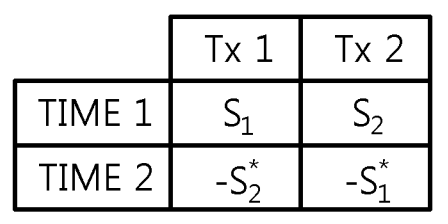

FIG. 9 shows a transmitted signal in a transmit diversity method using two transmission antennas according to an example.

When two transmission antennas are used and the transmit diversity order is 2, the signal transmitted through diversity modulation using STBC may be represented as the following Equation (1):

$$S = \begin{bmatrix} S_1 & S_2 \\ -S_1^* & S_1^* \end{bmatrix} \quad (1)$$

In the matrix in Equation (1), each column may represent a transmission antenna, and each row may represent a time slot.

$S_i$ may be the i-th QAM-modulated symbol to be transmitted or i-th PSK-modulated symbol to be transmitted, and * may represent a conjugate.

As shown in Equation (1), when two transmission antennas are used, two symbols may be simultaneously transmitted using STBC. This may be represented as shown in FIG. 9. In FIG. 9, Tx 1 and Tx 2 may be transmission antenna 1 and transmission antenna 2, respectively.

The number of signal generation units 510, the number of signal modulation units 520, the number of configuration units 530, and the number of transmission filters 550 may be equal to the number of symbols in the signal. Also, the number of transmission antennas in the antenna array 560 may be equal to the number of symbols in the signal. That is, the number of signal generation units 510, the number of signal modulation units 520, the number of configuration units 530, the number of transmission filters 550, and the number of transmission antennas may be determined depending on the number of symbols to be transmitted at the same time in the signal.

Hereinafter, the transmission antennas may represent multiple transmission antennas in the antenna array 560.

Symbols modulated using STBC may be linearly modulated by the respective transmission filters. The symbol transmission speed of linear modulation may correspond $\tau T$. The transmission filters may be filters that are respectively applied to the transmission antennas. The linearly modulated signal may be output by the transmission antenna.

The linearly modulated signal may be represented as the following Equation (2):

$$a(t) = \sum_k s_i(k) g(t - k\tau T) \qquad (2)$$

where $s_i$ denotes the i-th symbol, g(t) denotes a transmission filter, $\tau$ denotes a variable for adjusting sampling time, T may represent a symbol transmission speed at a Nyquist rate. For example, T may denote a symbol transmission period at a Nyquist rate. t denotes time.

a(t) may represent a signal that is linearly modulated at time t.

When the value of $\tau$ is less than 1, there may be an overlap between the symbols of transmission filters. In the case of the signal received in the FTN environment in which the value of $\tau$ is less than 1, a target symbol may include interference of a symbol before the target symbol and interference of a symbol after the target symbol, as shown in FIG. 2. With such interference, the signal received in the FTN environment may be a combination of N signals that were simultaneously transmitted using the antenna array 560. Also, ISI may occur due to the overlap between symbols.

As the value of $\tau$ is smaller, the number of overlapping symbols may increase, and with an increase in the number of overlapping symbols, more severe ISI may be generated. However, as the value of $\tau$ is smaller, the sampling period of a signal may be decreased, and as the sampling period is decreased, a transmission rate may be improved.

The FTN-based diversity signal may be transmitted from the transmission apparatus 500 to the reception apparatus 600 over multipath channels and an Additive White Gaussian Noise (AWGN) channel. The reception apparatus 600 may receive the signal output from the transmission apparatus 500.

Here, $Y_l$ and $Y_{l+1}$, which are l-th and l+1-th received signals, may be represented as the following Equation (3):

$$\begin{bmatrix} y_l \\ y_{l+1} \end{bmatrix} = \begin{bmatrix} x_l & x_{l+1} \\ -x_{l+1}^* & x_l^* \end{bmatrix} \begin{bmatrix} H_1 \\ H_2 \end{bmatrix} + \begin{bmatrix} W_l \\ W_{l+1} \end{bmatrix} \qquad (3)$$

where $H_i$ denotes a multipath channel applied to the i-th transmission antenna in the antenna array 560 of the transmission apparatus 500, and $W_l$ denotes the output of a reception filter for AWGN, which is applied to l-th received signal.

The signal received by the antenna array 610 is filtered by the reception filter 620 and sampled by the sampler 630.

The impulse response of the reception filter 620 may be g*(−t). The sampling rate may be 1/$\tau$T.

The sampled signal $x_l$ may be represented as the following Equation (4):

$$x_l = \sum_k s_l(k) f((n-k)\tau T) \qquad (4)$$

For f(t), the following Equation (5) may be satisfied:

$$f(t) = g(t) * g^*(-t) \qquad (5)$$

In Equation (4), $s_l$ denotes a signal when there is no interference, and $s_l(k)$ denotes an actually received signal, that is, a signal affected by interference.

The signals $\hat{x}_l$ and $\hat{x}_{l+1}$, and detected by the adder unit 640, may be represented as the following Equation (6) and Equation (7):

$$\hat{x}_l = H^*_1 \bullet y_l + H_2 \bullet y^*_{l+1} \qquad (6)$$

$$\hat{x}_{l-1} = H^*_2 \bullet y_l - H_1 \bullet y^*_{l+1} \qquad (7)$$

Through the above-described process, the received FTN signal, which has acquired the diversity gain, may be detected. Then, the demodulation unit 650 may eliminate FTN interference from the received FTN signal.

The transmit diversity method may be applied not only when two transmission antennas are used but also when three or more transmission antennas are used.

The following Equation (8) may represent a signal when the diversity order of STBC is 8 in the case in which four transmission antennas are used:

$$(S_1, S_2, S_3, S_4) = \begin{bmatrix} S_1 & S_2 & S_3 & S_4 \\ -S_2 & S_1 & -S_4 & S_3 \\ -S_3 & S_4 & S_1 & -S_2 \\ -S_4 & -S_3 & S_2 & S_1 \\ S_1^* & S_2^* & S_3^* & S_4^* \\ -S_2^* & S_1^* & -S_4^* & S_3^* \\ -S_3^* & S_4^* & S_1^* & -S_2^* \\ -S_4^* & -S_3^* & S_2^* & S_1^* \end{bmatrix} \qquad (8)$$

The following Equation (9) may represent a signal when the diversity order of STBC is 4 in the case in which four transmission antennas are used:

$$(S_1, S_2, S_3) = \begin{bmatrix} S_1 & S_2 & S_3 & 0 \\ -S_2^* & S_1^* & 0 & -S_3 \\ -S_3^* & 0 & S_1^* & S_2 \\ 0 & S_3^* & -S_2^* & S_1 \end{bmatrix} \quad (9)$$

When the signal shown in Equation (8) or Equation (9) is used, it is possible to transmit and receive an FTN signal based on a diversity method. Also, another diversity method may also be applied to the above-described embodiment.

Figure 10:
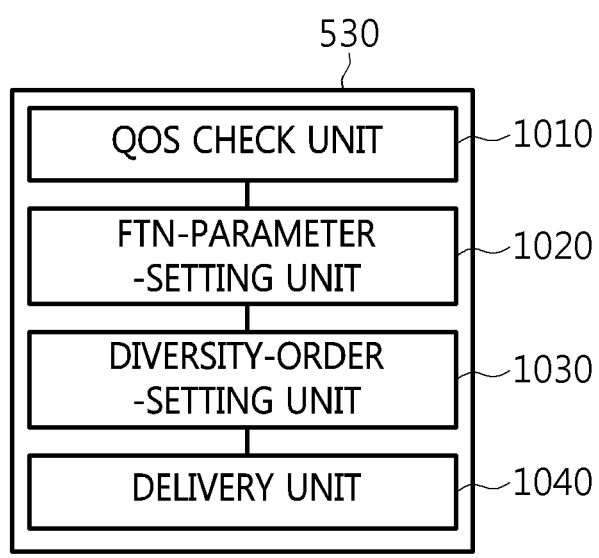
FIG. 10 is a block diagram of the configuration unit of a transmission apparatus according to an embodiment.

FIG. 10 is a block diagram of the configuration unit of a transmission apparatus according to an embodiment.

As described above, as the value of $\tau$ is smaller, the number of overlapping symbols may increase, and more severe ISI may be generated. Furthermore, such increase in the number of overlapping symbols and the generation of more severe ISI may deteriorate overall performance.

However, as the value of $\tau$ is smaller, the sampling period of a signal may decrease, and as the sampling period is decreased, a transmission rate may be improved.

When the value of $\tau$ is small, if a high diversity order is applied, an error rate depending on the diversity gain may be reduced. That is, a high diversity order may compensate for performance degradation arising from the use of a low $\tau$.

To this end, the configuration unit 530 may adjust a diversity order and an FTN parameter in consideration of the QoS required of the transmission apparatus 500.

The FTN parameter may be $\tau T$ or a variable $\tau$ for adjusting FTN sampling time.

For example, when a high transmission rate is required, the configuration unit 530 may raise the diversity order and decrease the value of $\tau$. When the diversity order is raised, the error rate of a signal may be decreased, and when the value of $\tau$ is decreased, transmission efficiency may be improved.

Accordingly, the FTN method and the diversity method may be performed together. Also, QoS required of the transmission apparatus 500 is satisfied, and a high transmission rate may be achieved.

The configuration unit 530 of the transmission apparatus 500 may include a QoS check unit 1010, an FTN-parameter-setting unit 1020, a diversity-order-setting unit 1030, and a delivery unit 1040. The functions and operations of the QoS check unit 1010, the FTN-parameter-setting unit 1020, the diversity-order-setting unit 1030, and the delivery unit 1040 will be described below with reference to FIG. 11.

Figure 11:
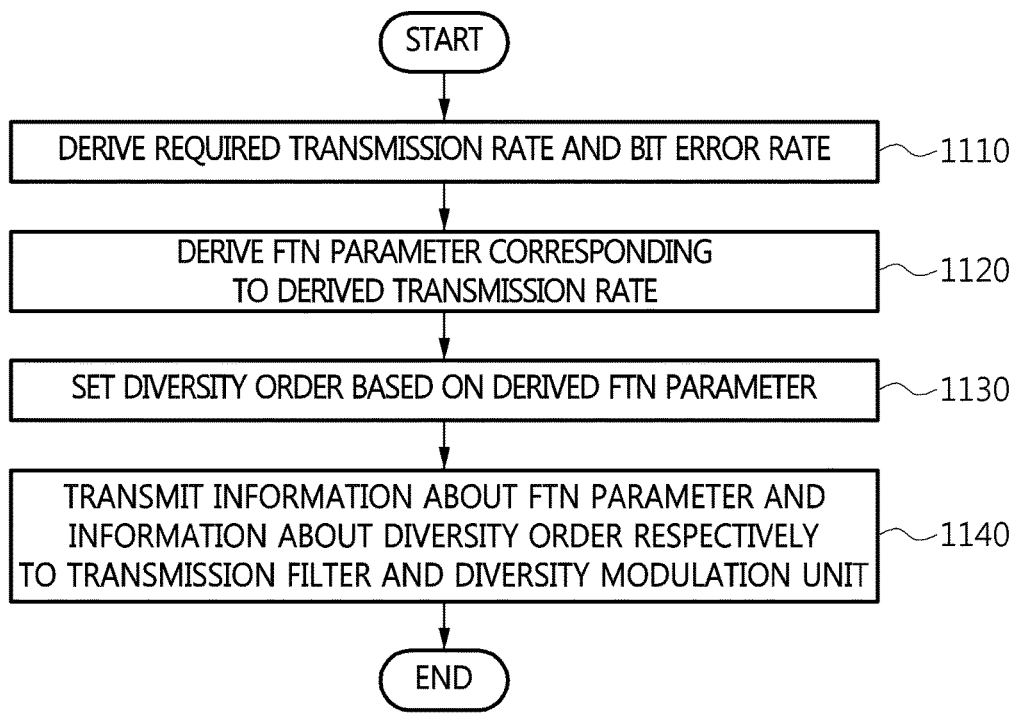
FIG. 11 is a flowchart of a method for setting a diversity order and an FTN parameter according to an embodiment.

FIG. 11 is a flowchart of a method for setting a diversity order and an FTN parameter according to an embodiment.

Step 730, described above with reference to FIG. 7, may include the following steps 1110, 1120, 1130 and 1140.

At step 1110, the QoS check unit 1010 may check the QoS required of the transmission apparatus 500.

QoS may include a Bit Error Rate and a transmission rate required for communication by the transmission apparatus 500. The QoS check unit 1010 may derive a Bit Error Rate and a transmission rate depending on the QoS required of the transmission apparatus 500.

At step 1120, the FTN-parameter-setting unit 1020 may derive an FTN parameter corresponding to the requirement of the transmission apparatus 500.

For example, the FTN-parameter-setting unit 1020 may derive an FTN parameter corresponding to the QoS required of the transmission apparatus 500.

For example, the FTN-parameter-setting unit 1020 may derive an FTN parameter corresponding to the transmission rate required of the transmission apparatus 500. The FTN-parameter-setting unit 1020 may set the value of the FTN parameter so as to satisfy the transmission rate required of the transmission apparatus 500.

The FTN parameter may include a variable $\tau$ for adjusting sampling time.

The FTN parameter may include $\tau T$ of linear modulation of FTN.

At step 1130, the diversity-order-setting unit 1030 may set a diversity order based on the FTN parameter and a Bit Error Rate required of the transmission apparatus 500.

The diversity-order-setting unit 1030 may analyze the degree of performance degradation depending on the FTN parameter and the Bit Error Rate required of the transmission apparatus 500. The diversity order may be a value required depending on the degree of performance degradation, which is analyzed depending on the FTN parameter, and on the Bit Error Rate required of the transmission apparatus 500.

For example, the diversity-order-setting unit 1030 may raise the diversity order as the symbol transmission speed is higher.

At step 1140, the delivery unit 1040 may transmit information about the FTN parameter and information about the diversity order to the transmission filter 550 and the diversity modulation unit 540 of the transmission apparatus 500, respectively.

Also, the delivery unit 1040 may transmit information about the FTN parameter and information about the diversity order to the reception apparatus 600, which receives a signal output from the transmission apparatus 500.

The reception apparatus 600 may demodulate and reconstruct a received signal using the received information about the FTN parameter and the received information about the diversity order. Also, when information about the FTN parameter and the diversity order, set by the transmission apparatus 500, is not shared with the reception apparatus 600, the reception apparatus 600 may estimate the FTN parameter and the diversity order using another method, and may demodulate the received signal depending on the estimated FTN parameter and the estimated diversity order.

Figure 12:
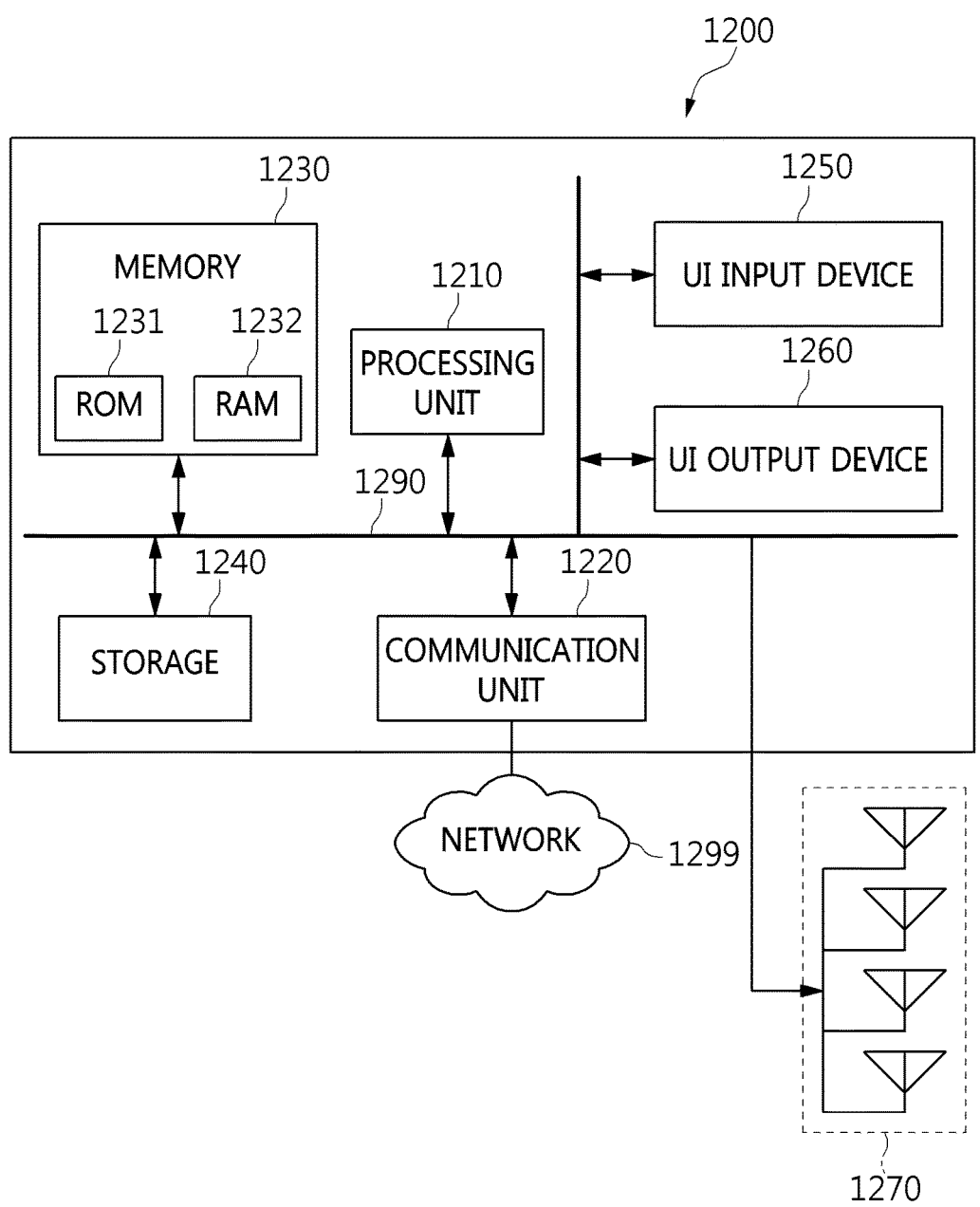
FIG. 12 shows an electronic device for implementing a transmission apparatus according to an embodiment.

FIG. 12 illustrates an electronic device for implementing a transmission apparatus according to an embodiment.

The transmission apparatus 500 may be implemented as the electronic device 1200 illustrated in FIG. 12. The electronic device 1200 may be a general-purpose computer system operating as the transmission apparatus 500.

As illustrated in FIG. 12, the electronic device 1200 may include at least some of a processing unit 1210, a communication unit 1220, memory 1230, storage 1240 and a bus 1290. The components of the electronic device 1200, such as the processing unit 1210, the communication unit 1220, the memory 1230, the storage 1240, and the like, may communicate with each other via the bus 1290.

The processing unit 1210 may be a semiconductor device for executing processing instructions stored in the memory 1230 or the storage 1240. For example, the processing unit 1210 may be at least one hardware processor.

The processing unit 1210 may process work required for the operation of the electronic device 1200. The processing unit 1210 may execute code corresponding to the operation of the processing unit 1210 or the steps described in the embodiments.

The processing unit 1210 may create, store and output information to be explained in the following embodiment, and may perform the operation of steps performed in the electronic device 1200.

The communication unit 1220 may be connected to a network 1299. The communication unit 1220 may transmit and receive data or information required for the operation of the electronic device 1200. The communication unit 1220 may transmit data to other devices over the network 1299, and may receive data from other devices over the network 1299. For example, the communication unit 1220 may be a network chip or port.

The memory 1230 and the storage 1240 may be various types of volatile or nonvolatile storage media. For example, the memory 1230 may include at least one of ROM 1231 and RAM 1232. The storage 1240 may include internal storage media, such as RAM, flash memory, a hard disk, and the like, and a detachable storage medium, such as a memory card or the like.

The function or operation of the electronic device 1200 may be performed when the processing unit 1210 executes at least one program module. The memory 1230 and/or the storage 1240 may store at least one program module. The at least one program module may be configured to be executed by the processing unit 1210.

At least some of the signal generation unit 510, the signal modulation unit 520, the configuration unit 530, and the transmission filter 500 of the above-described transmission apparatus 500 may be at least one program module.

Program modules in the form of an operating system, an application module, a library, and other program modules may be included in the electronic device 1200, and may be physically stored in various known memory devices. Also, at least some of the program modules may be stored in a remote memory device that is capable of communicating with the electronic device 1200. Meanwhile, the program modules may include a routine, a subroutine, a program, an object, a component, a data structure, and the like for executing a specific operation or task or implementing a specific abstract data type according to an embodiment, but the program modules are not limited thereto.

The electronic device 1200 may further include a user interface (UI) input device 1250 and a UI output device 1260. The UI input device 1250 may receive user input required for the operation of the electronic device 1200. The UI output device 1260 may output information or data based on the operation of the electronic device 1200.

The electronic device 1200 may further include multiple transmission antennas 1270. The multiple transmission antennas 1270 may correspond to the antenna array 560, which was described with reference to FIG. 5.

Figure 13:
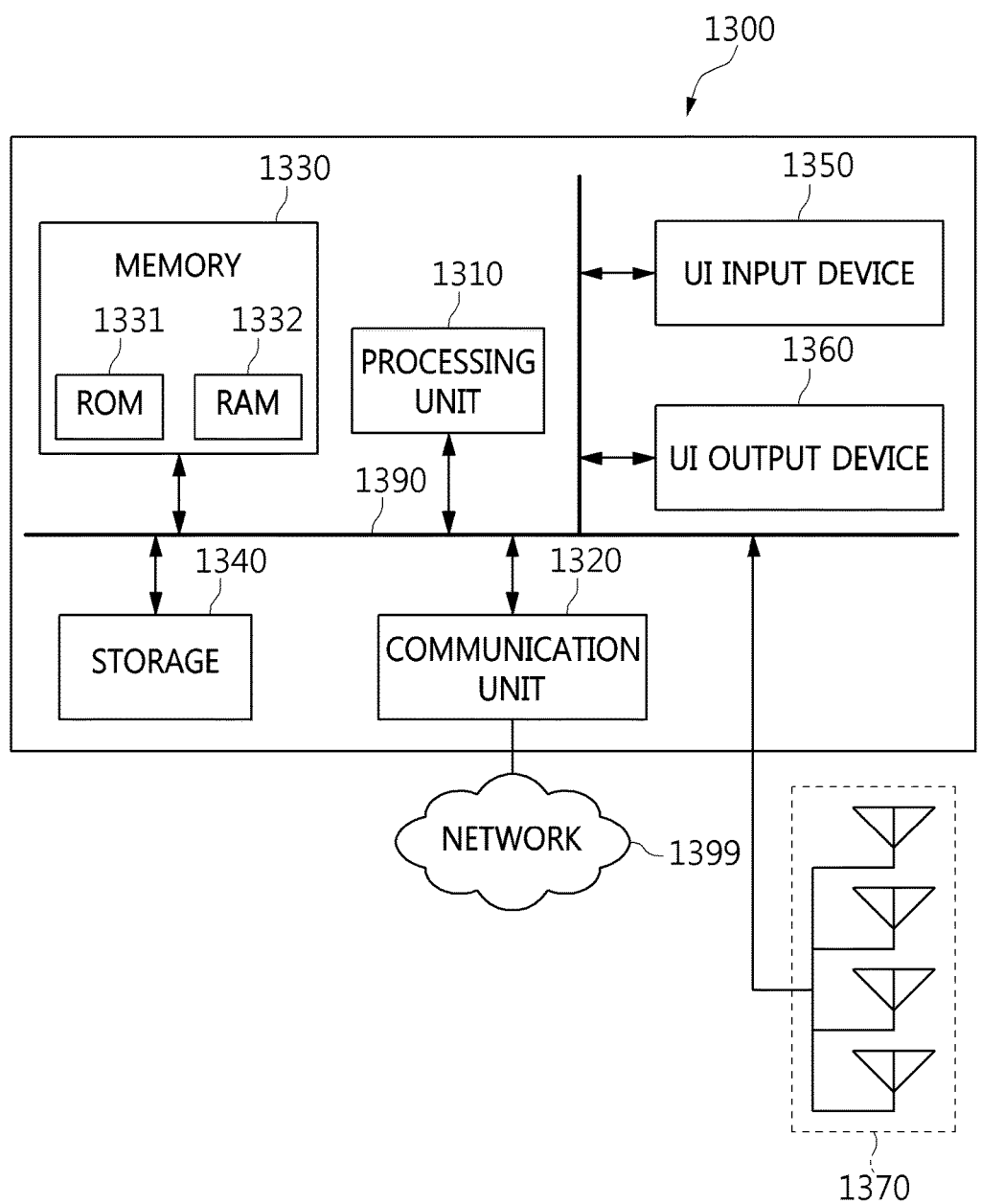
FIG. 13 shows an electronic device for implementing a reception apparatus according to an embodiment.

FIG. 13 illustrates an electronic device for implementing a reception apparatus according to an embodiment.

The reception apparatus 600 may be implemented as the electronic device 1300 illustrated in FIG. 13. The electronic device 1300 may be a general-purpose computer system operating as the reception apparatus 600.

As illustrated in FIG. 13, the electronic device 1300 may include at least some of a processing unit 1310, a communication unit 1320, memory 1330, storage 1340 and a bus 1390. The components of the electronic device 1300, such as the processing unit 1310, the communication unit 1320, the memory 1330, the storage 1340, and the like, may communicate with each other via the bus 1390.

The processing unit 1310 may be a semiconductor device for executing processing instructions stored in the memory 1330 or the storage 1340. For example, the processing unit 1310 may be at least one hardware processor.

The processing unit 1310 may process work required for the operation of the electronic device 1300. The processing unit 1310 may execute code corresponding to the operation of the processing unit 1310 or the steps described in the embodiments.

The processing unit 1310 may create, store and output information to be explained in the following embodiment, and may perform the operation of steps performed in the electronic device 1300.

The communication unit 1320 may be connected to a network 1399. The communication unit 1320 may transmit and receive data or information required for the operation of the electronic device 1300. The communication unit 1320 may transmit data to other devices over the network 1399, and may receive data from other devices over the network 1399. For example, the communication unit 1320 may be a network chip or port.

The memory 1330 and the storage 1340 may be various types of volatile or nonvolatile storage media. For example, the memory 1330 may include at least one of ROM 1331 and RAM 1332. The storage 1340 may include internal storage media, such as RAM, flash memory, a hard disk, and the like, and a detachable storage medium, such as a memory card or the like.

The function or operation of the electronic device 1300 may be performed when the processing unit 1310 executes at least one program module. The memory 1330 and/or the storage 1340 may store at least one program module. The at least one program module may be configured to be executed by the processing unit 1310.

At least some of the reception filter 620, the sampler 630, the adder unit 640, and the demodulation unit 650 of the above-described reception apparatus 600 may be at least one program module.

Program modules in the form of an operating system, an application module, a library, and other program modules may be included in the electronic device 1300, and may be physically stored in various known memory devices. Also, at least some of the program modules may be stored in a remote memory device that is capable of communicating with the electronic device 1300. Meanwhile, the program modules may include a routine, a subroutine, a program, an object, a component, a data structure, and the like for executing a specific operation or task or implementing a specific abstract data type according to an embodiment, but the program modules are not limited thereto.

The electronic device 1300 may further include a user interface (UI) input device 1350 and a UI output device 1360. The UI input device 1350 may receive user input required for the operation of the electronic device 1300. The UI output device 1360 may output information or data based on the operation of the electronic device 1300.

The electronic device 1300 may further include multiple reception antennas 1370. The multiple reception antennas 1370 may correspond to the antenna array 610, which was described with reference to FIG. 6.

The apparatus described herein may be implemented using hardware components, software components, and/or a combination thereof. For example, the apparatus and components described in the embodiments may be implemented using one or more general-purpose or special-purpose computers, for example, a processor, a controller, an arithmetic logic unit (ALU), a digital signal processor, a microcomputer, a field programmable array (FPA), a programmable logic unit (PLU), a microprocessor or any other device capable of responding to and executing instructions. The processing device may run an operating system (OS) and one or more software applications that run on the OS. The processing device may also access, store, manipulate, process, and create data in response to execution of the software. For convenience of understanding, the use of a single processing device is described, but those skilled in the art will understand that a processing device may comprise multiple processing elements and multiple types of processing elements. For example, a processing device may include multiple processors or a single processor and a single controller. Also, different processing configurations, such as parallel processors, may be used.

The software may include a computer program, code, instructions, or some combination thereof, and it is possible to configure processing devices or to independently or collectively instruct the processing devices to operate as desired. Software and data may be embodied permanently or temporarily in any type of machine, component, physical or virtual equipment, computer storage medium or device, or in a propagated signal wave in order to provide instructions or data to the processing devices or to be interpreted by the processing devices. The software may also be distributed in computer systems connected over a network such that the software is stored and executed in a distributed manner. In particular, the software and data may be stored in one or more computer-readable recording media.

The method according to the above-described embodiments may be implemented as a program that can be executed by various computer means. In this case, the program may be recorded on a computer-readable storage medium. The computer-readable storage medium may include program instructions, data files, and data structures, either solely or in combination. Program instructions recorded on the storage medium may have been specially designed and configured for the present invention, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as CD-ROM and a DVD, magneto-optical media, such as a floptical disk, ROM, RAM, and flash memory. Examples of the program instructions include machine code, such as code created by a compiler, and high-level language code executable by a computer using an interpreter. The hardware devices may be configured to operate as one or more software modules in order to perform the operation of the present invention, and vice versa.

There are provided an apparatus and method for acquiring a high transmission rate by applying a diversity method to a communication system using the FTN transmission method.

There are provided an apparatus and method for effectively improving reception performance by applying a diversity method to a communication system using the FTN transmission method.

There are provided an apparatus and method for providing high stability by applying a diversity method to a communication system using the FTN transmission method.

What is claimed is:

1. A method for transmitting a signal, performed by a transmission apparatus, comprising:
   setting a diversity order of diversity modulation based on a Faster-Than-Nyquist (FTN) parameter;
   generating a diversity signal by modulating a signal depending on the set diversity order;
   generating a linearly modulated signal by applying linear modulation, based on the FTN parameter, to the diversity signal; and
   outputting the linearly modulated signal.

2. The method of claim 1, wherein the FTN parameter includes a variable for adjusting a sampling time.

3. The method of claim 1, wherein the FTN parameter includes a symbol transmission speed of linear modulation.

4. The method of claim 3, wherein the diversity order is set higher as the symbol transmission speed is higher.

5. The method of claim 1, further comprising:
   deriving the FTN parameter corresponding to a transmission rate required of the transmission apparatus.

6. The method of claim 5, further comprising:
   deriving the transmission rate from a Quality of Service (QoS) required of the transmission apparatus.

7. The method of claim 1, wherein the diversity order is set based on a Bit Error Rate required of the transmission apparatus.

8. The method of claim 7, wherein the Bit Error Rate is derived from a QoS required of the transmission apparatus.

9. The method of claim 1, wherein the diversity order is a value required based on a degree of performance degradation analyzed depending on the FTN parameter.

10. The method of claim 1, further comprising:
    transmitting information about the FTN parameter to a transmission filter for performing the linear modulation.

11. The method of claim 1, further comprising:
    transmitting information about the diversity order to a reception apparatus that is to receive the output signal.

12. The method of claim 1, further comprising:
    transmitting information about the FTN parameter to a reception apparatus that is to receive the output signal.

13. A transmission apparatus, comprising:
    a diversity-order-setting unit for setting, using a processor, a diversity order of diversity modulation based on a Faster-Than-Nyquist (FTN) parameter;
    a diversity modulation unit for generating, using a processor, a diversity signal by modulating a signal depending on the set diversity order;
    a transmission filter for generating a linearly modulated signal by applying linear modulation based on the FTN parameter to the diversity signal; and
    an antenna array for outputting the linearly modulated signal.

14. A method for setting a diversity order, comprising:
    deriving a Faster-Than-Nyquist (FTN) parameter corresponding to a Quality of Service (QoS) required of a transmission apparatus; and
    setting a diversity order of diversity modulation based on the FTN parameter.

15. The method of claim 14, wherein the FTN parameter includes a variable for adjusting a sampling time.

16. The method of claim 15, wherein the diversity order is set higher as a value of the variable for adjusting sampling time is larger.

17. The method of claim 14, wherein the QoS includes a transmission rate required of the transmission apparatus.

18. The method of claim 14, wherein the diversity order is set based on a Bit Error Rate required of the transmission apparatus.

19. The method of claim 14, wherein the diversity order is a value required based on a degree of performance degradation analyzed depending on the FTN parameter.

20. The method of claim 14, further comprising:
    transmitting information about the diversity order to a reception apparatus that is to receive the output signal.

* * * * *